(12) United States Patent
Fackler et al.

(10) Patent No.: US 7,783,404 B2
(45) Date of Patent: Aug. 24, 2010

(54) APPARATUS AND METHOD FOR FNR CALIBRATION AND TESTING NEUTRAL SAFETY SWITCH THRESHOLDS IN AN AGRICULTURAL WINDROWER

(75) Inventors: Robert L. Fackler, Ephrata, PA (US); Jeremy D. Peters, McConnellsburg, PA (US)

(73) Assignee: CNH America LLC, New Holland, PA (US)

(*) Notice: Subject to any disclaimer, the term of this patent is extended or adjusted under 35 U.S.C. 154(b) by 818 days.

(21) Appl. No.: 11/487,646

(22) Filed: Jul. 17, 2006

(65) Prior Publication Data

US 2007/0016350 A1    Jan. 18, 2007

Related U.S. Application Data

(60) Provisional application No. 60/699,944, filed on Jul. 16, 2005.

(51) Int. Cl.
 *F02D 41/04* (2006.01)
 *F02D 11/10* (2006.01)
 *A01D 45/00* (2006.01)

(52) U.S. Cl. .................... 701/50; 701/21; 701/99; 180/315; 702/85; 702/88; 345/161

(58) Field of Classification Search ................ 701/1, 701/2, 3, 11, 12, 13, 21, 26, 50, 115, 99, 701/110; 180/315, 332, 333, 334, 335; 702/85, 702/88; 244/220, 234; 345/161
See application file for complete search history.

(56) References Cited

U.S. PATENT DOCUMENTS

| | | | |
|---|---|---|---|
| 4,809,173 A | | 2/1989 | Fukami et al. |
| 4,905,645 A | * | 3/1990 | Bonse et al. ............. 123/198 D |
| 4,979,117 A | * | 12/1990 | Hattori et al. ................ 701/110 |
| 5,048,479 A | * | 9/1991 | Bartke .................... 123/198 D |
| 6,026,783 A | * | 2/2000 | Nestvall et al. .............. 123/399 |
| 6,086,236 A | * | 7/2000 | De Raad et al. ............... 700/28 |
| 6,170,623 B1 | | 1/2001 | Eismann et al. ............. 192/3.55 |
| 6,352,146 B1 | | 3/2002 | Eismann et al. ............ 192/3.58 |

(Continued)

OTHER PUBLICATIONS

Poclain Hydraulics, Smartdrive HHT Hand Held Terminal, Poclain Hydraulics Industrie, 2004.*

(Continued)

*Primary Examiner*—Thomas G Black
*Assistant Examiner*—Peter D Nolan
(74) *Attorney, Agent, or Firm*—Patrick M. Sheldrake; John William Stader; Michael G. Harms

(57) ABSTRACT

Calibration of an FNR lever, wherein signal outputs as the FNR lever is transitioned to and from the neutral position and through a range of positions, are determined. It is then determined whether the values are within expected norms. If not, a fault condition exists. The operator is also prompted to input acknowledgments when the FNR lever is at the fully rearward and forward positions. Signal values outputted by a neutral switch are sensed when the lever is initially moved to the neutral position, and at a predetermined time thereafter, to test a propulsion enable or latch relay which is to provide a predetermined output for a predetermined time after the lever moves into the neutral position, for transitioning of the system to neutral operation.

19 Claims, 11 Drawing Sheets

U.S. PATENT DOCUMENTS

| | | | | |
|---|---|---|---|---|
| 6,425,450 | B1 | 7/2002 | Lansberry | 180/9.36 |
| 6,704,643 | B1 * | 3/2004 | Suhre et al. | 701/115 |
| 6,901,729 | B1 | 6/2005 | Otto et al. | 56/208 |
| 2001/0035755 | A1 * | 11/2001 | Shirato | 324/418 |

OTHER PUBLICATIONS

Liber-T Medtech, Programming Keyboard User Manual, Liber-T Medtech, 2003.*

CH Products, Flight Sim Yoke PC, CH Products, 2000.*

Yoda, et al. US Pat. Publication No. US 2005/0014427, dated Jan. 20, 2005.

Yoda, et al. US Pat. Publication No. US 2005/0170715, dated Aug. 4, 2005.

* cited by examiner

APPARATUS AND METHOD FOR FNR CALIBRATION AND TESTING NEUTRAL SAFETY SWITCH THRESHOLDS IN AN AGRICULTURAL WINDROWER

This application claims the benefit of U.S. Provisional Application No. 60/699,944, filed Jul. 16, 2005.

This application incorporates by reference the following computer program listing appendix on the enclosed 2 compact disks which are duplicates of one another.

18166FNR_c.pdf 1,843 KB Feb. 12, 2009

TECHNICAL FIELD

The present invention relates to equipment calibration and, more particularly, to apparatus and a method embodied in a computer program for calibration of an FNR lever and testing a neutral safety switch in an agricultural windrower.

BACKGROUND OF THE INVENTION

U.S. Pat. No. 6,901,729 is incorporated herein by reference in its entirety. This patent describes a windrower. While other embodiments are possible, it is this general type of windrower that provides the best example of the type of system with which the apparatus and method of the instant invention can/should be used. Provisional Patent Application No. 60/699,944, filed Jul. 16, 2005, is also incorporated herein by reference in its entirety.

In any modern windrower, and much other similar equipment, it is important to efficient and effective operation that certain system components be calibrated so that outputs can be reasonably relied upon by the operator.

One such component is the forward-neutral-rearward (FNR) lever, also referred to and as the multi-function handle (MFH). The FNR lever or MFH is an operator controlled component located within the operator platform area or cab, and is manipulated by an operator for controlling propulsion direction and speed. The FNR lever has a neutral position, which is typically a straight up position, and is typically movable from the neutral position forwardly for inputting commands to the windrower propulsion system for effecting forward movements of the windrower, and is movable from the neutral position rearwardly for inputting commands for effecting rearward movements of the windrower. The FNR lever or MFH is an assembly of components, including a sensor device such as a potentiometer which outputs signals, such as a varying voltage to a propulsion system controller, the value of which signal or voltage is a function of the lever position. A suitable conductive path, such as a wiring harness or the like, is provided for communication of the signals. The FNR lever or MFH also typically includes a switch commonly referred to as the neutral safety switch or neutral switch, which is transitioned from one state to another state when the lever or MFH is moved to and from the neutral position. The state of this switch is also communicated to the propulsion system controller via a suitable conductive path, such as a wiring harness or the like.

Because the FNR lever or MFH is an assemblage of components, and is itself mounted in an assembly, it has been found that there will often be slight variations in output signals between different FNR levers or MFHs, and between different windrowers, such that it is desirable to calibrate the FNR lever or MFH initially before use, after service or replacement, and any time that a fault condition is evident, so as to ensure reliable, accurate outputs.

Additionally, the FNR lever or MFH, or the circuitry of the propulsion system can include devices such as electrical relays and the like, which can be subject to problems which may negatively effect or degrade the operation of the propulsion system or may be indicators of imminent failure of the device. For instance, at some FNR lever positions it may be desirable for a relay to latch for some predetermined time period, for purposes such as to allow for transitioning operating systems of the propulsion system to a new state. As an example, a system may include a propulsion enable relay which is a latching relay which remains latched for a short period after the FNR lever is moved from a propulsion position (forward or rearward) to the neutral position, to provide continued power for transitioning the propulsion mechanism from a propulsion state to the neutral state. It would thus be desirable to have a capability to reliably detect problems with such devices, as part of a calibration process or routine.

Therefore, what is sought is an apparatus and method for calibration of an FNR lever or MFH and detection of problems with related devices, to ensure reliable, accurate outputs therefrom.

SUMMARY OF THE DISCLOSURE

According to the invention, an apparatus and method for calibration of an FNR lever or multifunction handle (MFH), to ensure reliable, accurate outputs therefrom, and detection of problems with related devices, such as relays and the like, is disclosed.

According to a preferred aspect of the invention, the apparatus and method determine signal outputs as the FNR lever or MFH is transitioned from the neutral position to a rearward propulsion position, and from the neutral position to a forward propulsion position. The apparatus and method is also operable for determining signal values outputted as the FNR lever or MFH moves through a range of rearward propulsion positions, and a range of forward propulsion positions, and when the lever or MFH is in the fully rearward and fully forward positions. The determined signal values are then compared with benchmark values for the same positions, to determine whether the values are within expected norms. If not, it is determined that a fault condition exists and a signal representative of the fault condition is outputted to the operator. The fault conditions can be related to the particular signal values that are beyond the expected norm, to facilitate isolation and diagnosis of the problem.

Additionally according to the invention, the operator is prompted to input acknowledgments when the FNR lever or MFH is at the fully rearward, fully neutral, and fully forward positions, to enable the calibration of the lever.

Still further according to the invention, signal values outputted by the neutral switch are sensed when the lever or MFH is initially moved to the neutral position, and at a predetermined time thereafter, to test an associated propulsion latch relay which is configured for providing a predetermined output for a predetermined time after movement of the lever or MFH into the neutral position, to allow for transitioning of the propulsion system to neutral operation.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENTS

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail. Still further, in this description, the terms FNR lever, multi-function handle and MFH referred to the same item, and therefore are interchangeable.

Figure 1:
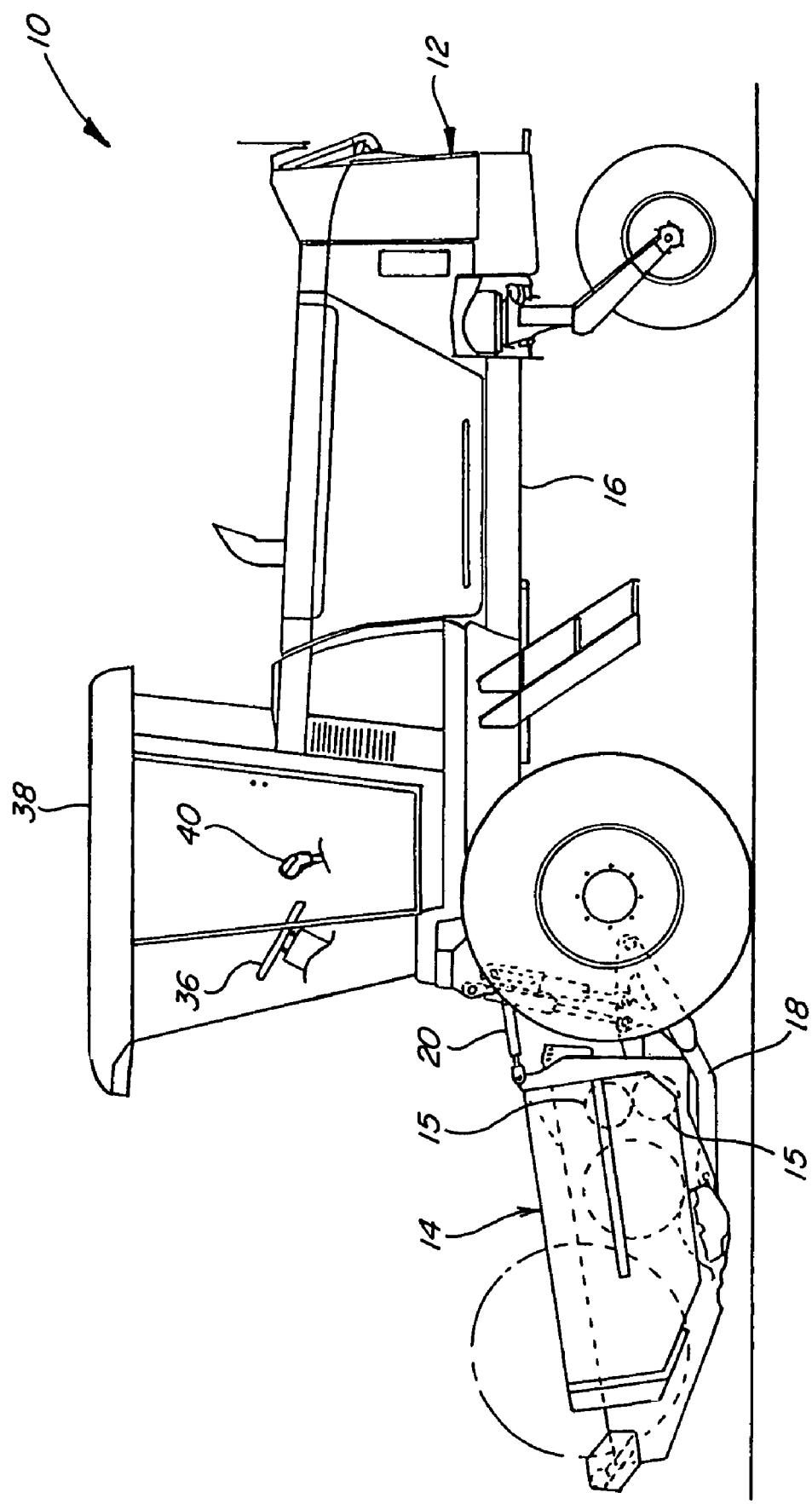
FIG. 1 is a partial side elevational view of a windrower of the type with which the invention may be used, including a header for severing crops from a field, mounted on a front end of the windrower.
Figure 2:
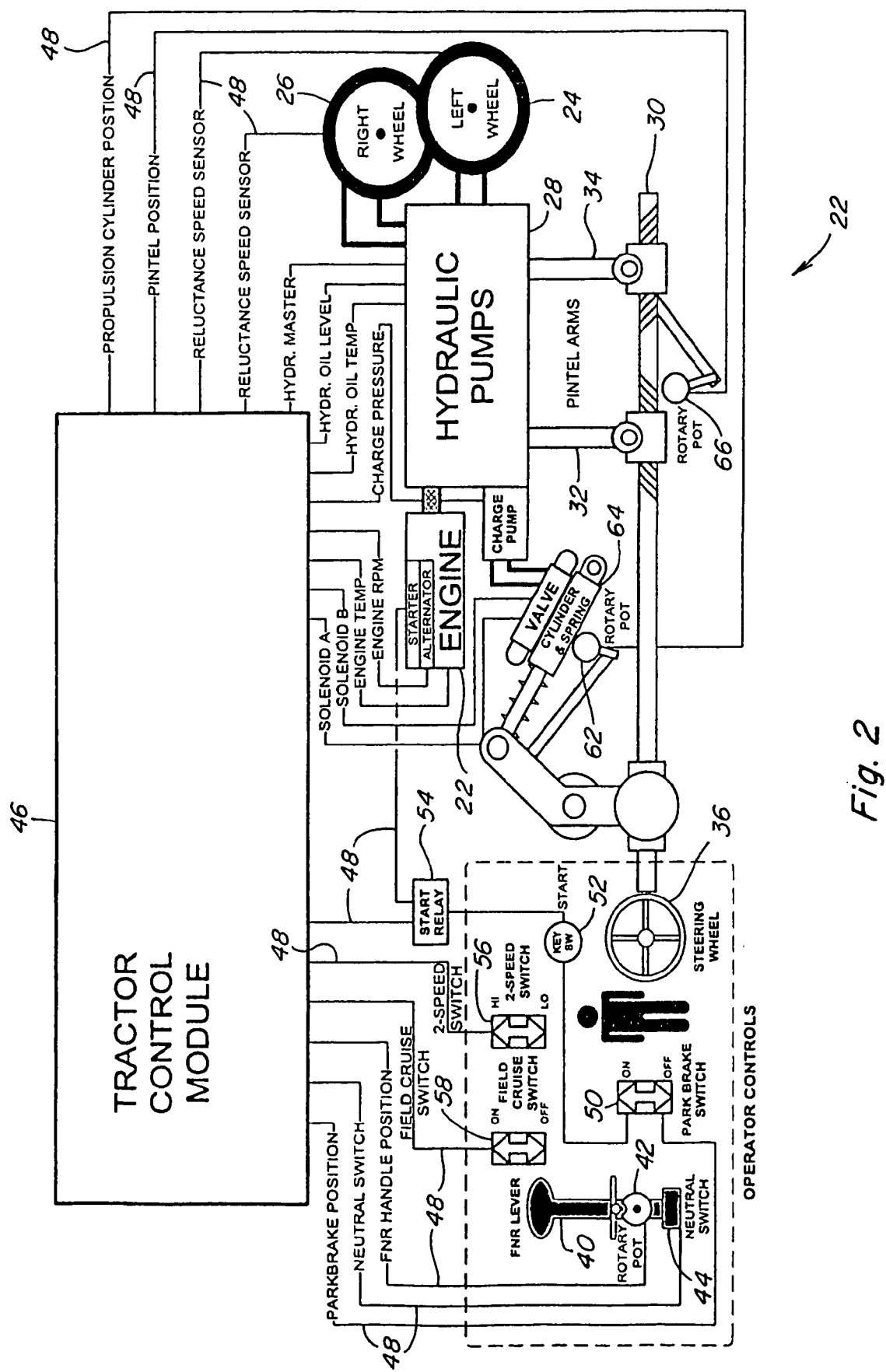
FIG. 2 is a simplified diagrammatic representation of a propulsion driveline of the windrower incorporating aspects of the instant invention.

FIG. 1 shows a self-propelled windrower 10 incorporating the apparatus and method of the invention; however, it will be appreciated that the principles of the present invention are not limited to a self-propelled windrower, or to any specific type of harvesting machine.

In the illustrated embodiment, the self-propelled windrower 10 comprises a tractor 12 and a header 14, the header 14 being attached to the front end of the frame 16 or chassis of the tractor 12. The header may be of generally any suitable construction and design, and may include not only crop-harvesting mechanisms, but also crop conditioners such as elongate rolls 15. Such attachment of the header 14 to the frame 16 is achieved through a pair of lower arms 18 (only the left one being shown, the right being generally the same) pivoted at one end to the frame 16 and at the other end to the header 14, as well as through a central upper link 20.

One or more cylinders, such as individual lift and flotation cylinders, or a single lift/flotation cylinder, interconnects the lower arm 18 and the frame 16 on each side of the header.

Typical features and operation of a system for controlling the lift and flotation functions for a header, such as header 14 depicted herein, are disclosed in U.S. Pat. No. 6,901,729, incorporated herein by reference.

Referring also to FIGS. 2, 3, 4 and 5, windrower 10 includes a propulsion driveline 22 controllably operable using operator controls for rotatably driving a left wheel 24 and a right wheel 26 for propelling windrower 10 over a ground or other surface. Hydraulic motors (not shown) in connection with each wheel 24 and 26, respectively, are provided with fluid under pressure by hydraulic pumps 28, for driving the wheels. The pumps 28 can be differentially controlled for supplying different and varying amounts of pressurized fluid to the hydraulic motors, for effecting desired movements of windrower 10, including steering movements, as effected by operation of a rotatable and longitudinally movable propulsion rod 30 in connection with pintel arms 32 and 34 movable for controlling displacement of pumps 28 in the well-known manner. Steering commands are inputted to driveline 22 by an operator via an operator control which is a steering wheel 36 disposed in an operator cab 38 of windrower 10. Steering movements of windrower 10 are effected by rotating respective wheels 24 and 26 at different speeds. Propulsion speed and direction commands are inputted to driveline 22 by an operator via an operator control which is a FNR lever 40 also disposed in cab 38.

FNR lever 40 is configured to operate a suitable sensor or sensors operable for generating varying information or outputs representative of the position of lever 40 when lever 40 is manipulated or moved, including a rotary potentiometer 42 and a neutral switch 44, both of which are connected to a tractor control module 46 via a suitable conductive path or paths 48, which can be, for instance, a wire or wires of a wiring harness, an optical path, a wireless path, or the like. Movements of FNR lever 40 in relation to the neutral position will cause potentiometer 42 to output varying signals representative of the position of lever 40, which signals are preferably voltages. It is desired for these voltage signals to very precisely indicate the position of lever 40, such that precise control of the forward and rearward movements of windrower 10 can be achieved. And, movements of FNR lever 40 into the neutral position, and out of the neutral position, will cause changes in the operating state of switch 44. Here, forward movements of FNR lever 40 from a generally straight up neutral position shown, will effect a change of state of switch 44 which will be outputted to control module 46, which will responsively power up the propulsion driveline to propel the windrower in a forward direction, control module 46 controlling the forward speed as a function of the voltage output of potentiometer 42. Similarly, rearward movement of FNR lever 40 from the neutral position will effect a change of state of switch 44 outputted to control module 46 to affect operation of the propulsion driveline in the reverse direction, and the voltage output of potentiometer 42 will control reverse speed. It is also desired that, when lever 40 is moved into the neutral position, the propulsion system be controlled to de-stroke or otherwise transition into a non-propelling state.

Other operator controls include a park brake switch 50 also connected to tractor control module 46 via a conductive path 48, and via another conductive path 48 to a key switch 52 and a start relay 54 in connection with a starter of engine 22 and with tractor control module 46. A 2-speed switch 56 is connected to tractor control module 46 via another conductive path 48, as is a field cruise switch 58.

Tractor control module 46 is in connection with a rotary potentiometer 62 via a conductive path 48, potentiometer 62 being operable for outputting information representative of the position of a propulsion cylinder 64. A rotary potentiometer 66 is operable for outputting information representative of the position of pintel arms 32 and 34 to module 46 via another conductive path 48. Information representative of speed of respective wheels 24 and 26 is determined by reluctance speed sensors (FIG. 5) and communicated via conductive paths 48 to module 46.

Figure 3:
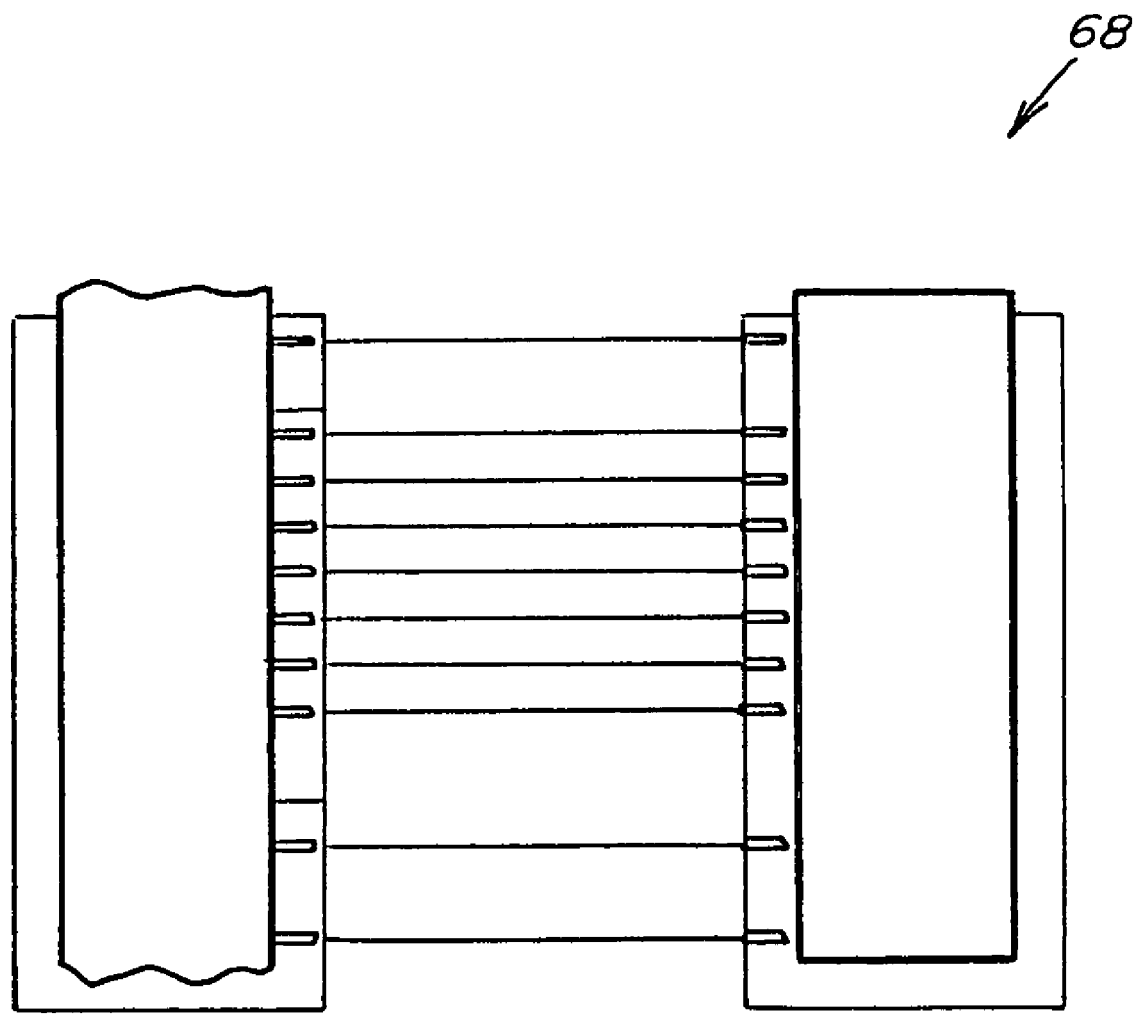
FIG. 3 is a schematic of circuitry of a multifunction handle of the windrower.

FIG. 3 schematically illustrates circuitry 68 of FNR lever 40.

Figure 4:
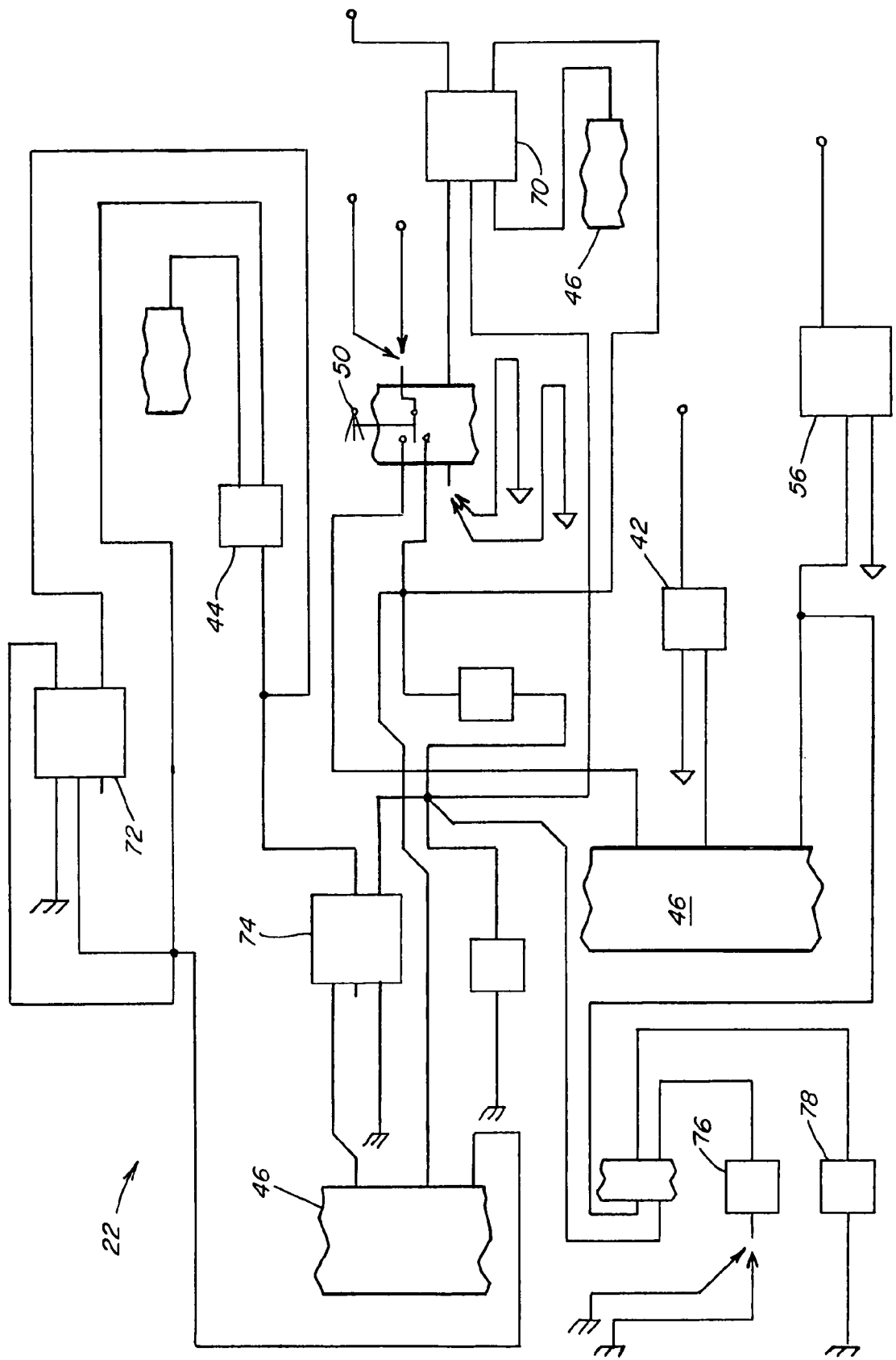
FIG. 4 is a schematic of aspects of circuitry of the propulsion driveline.

FIG. 4 schematically illustrates aspects of propulsion driveline 22 associated primarily with the operator controls, including potentiometer 42; neutral switch 44; control module 46; park brake switch 50; speed switch 56; and additionally, a park brake latch relay 70; a propulsion enable relay 72, also sometimes referred to as a propulsion latching relay; and a propulsion interlock relay 74. Other illustrated elements of propulsion driveline 22 include a brake valve solenoid 76 and a ground speed high solenoid 78.

Figure 5:
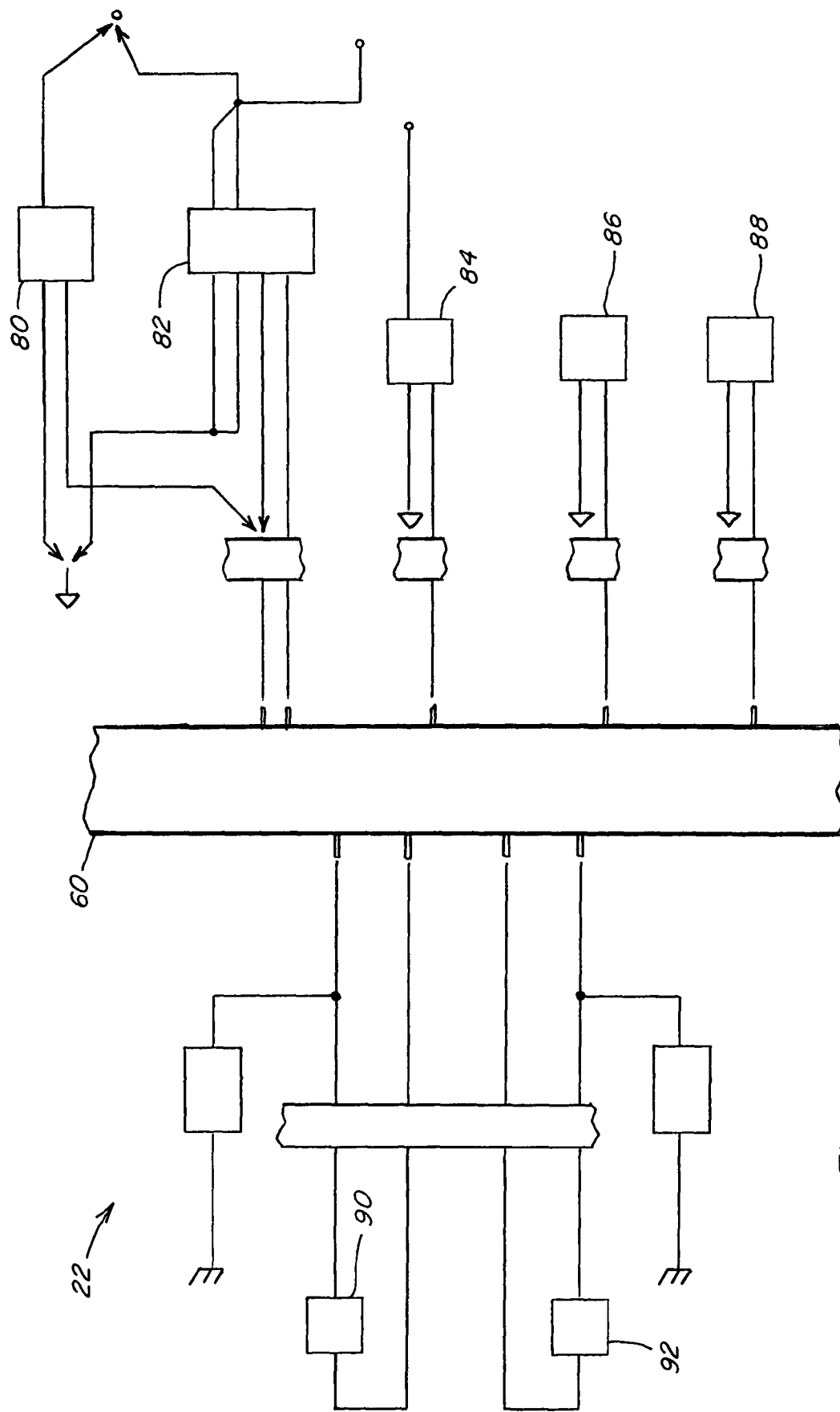
FIG. 5 is a schematic of other aspects of circuitry of the propulsion driveline.
Figure 6:
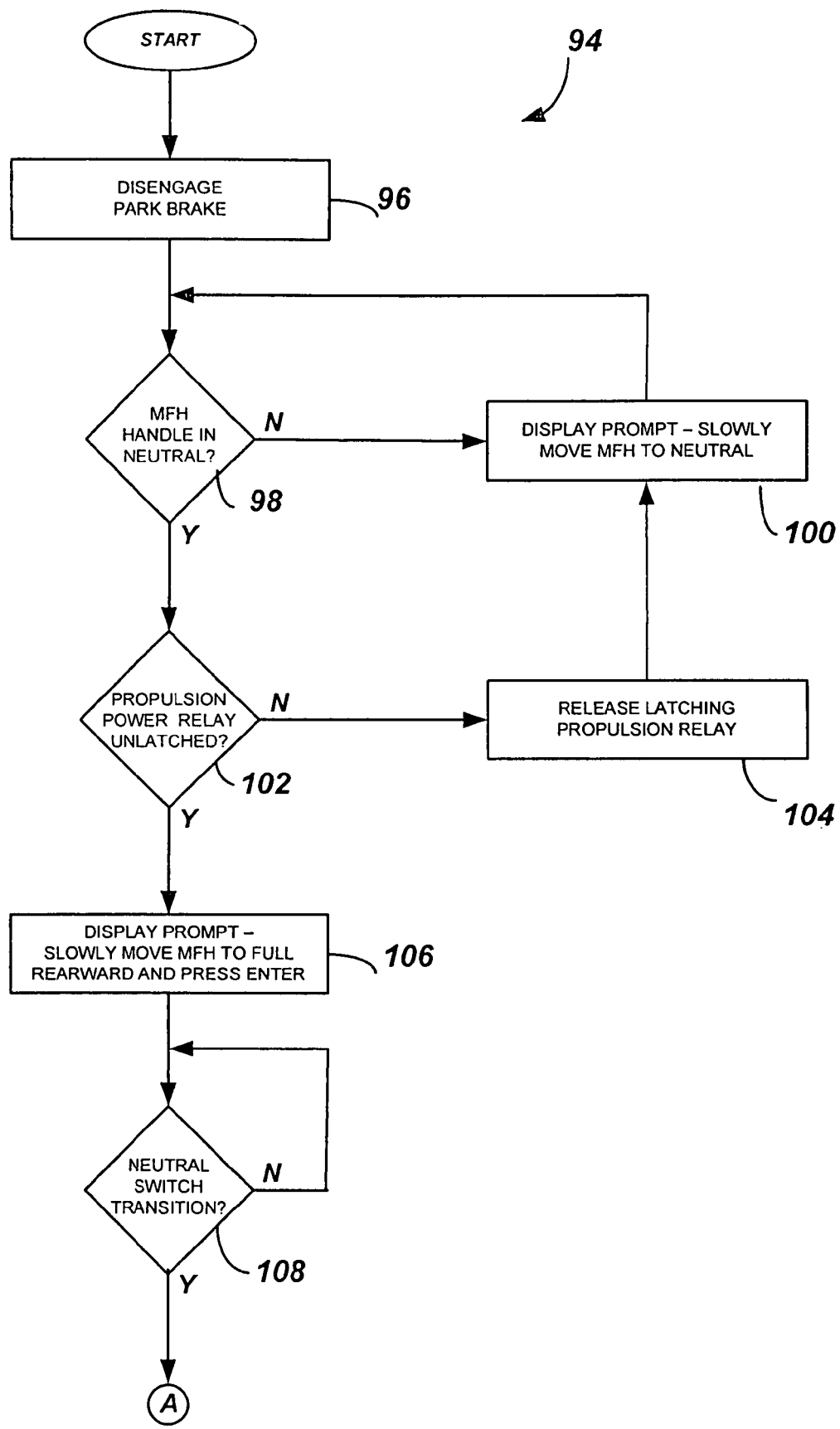
FIG. 6 is a high-level flow diagram illustrating steps of a method of the instant invention.
Figure 7:
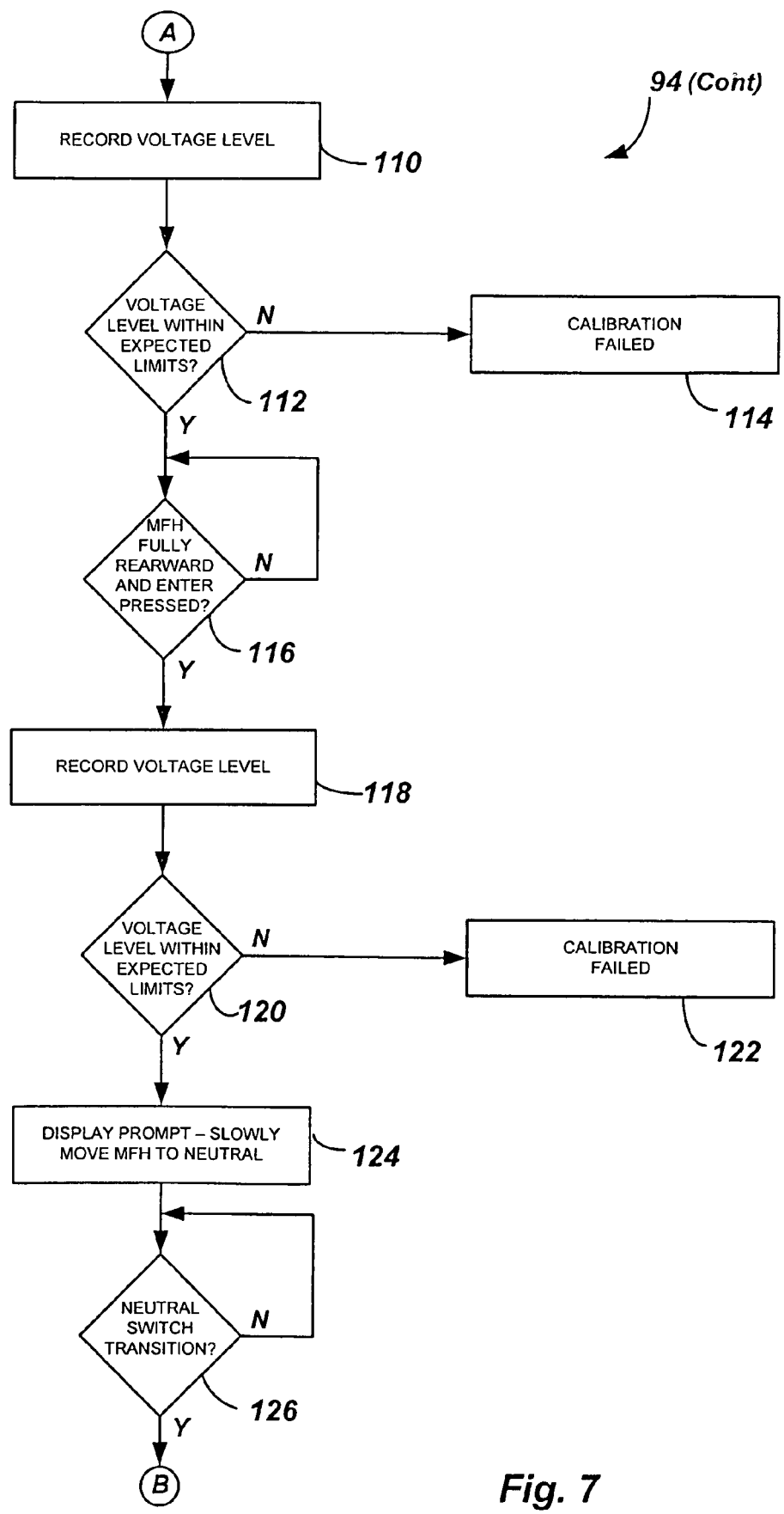
FIG. 7 is a continuation of the flow diagram of FIG. 6.
Figure 8:
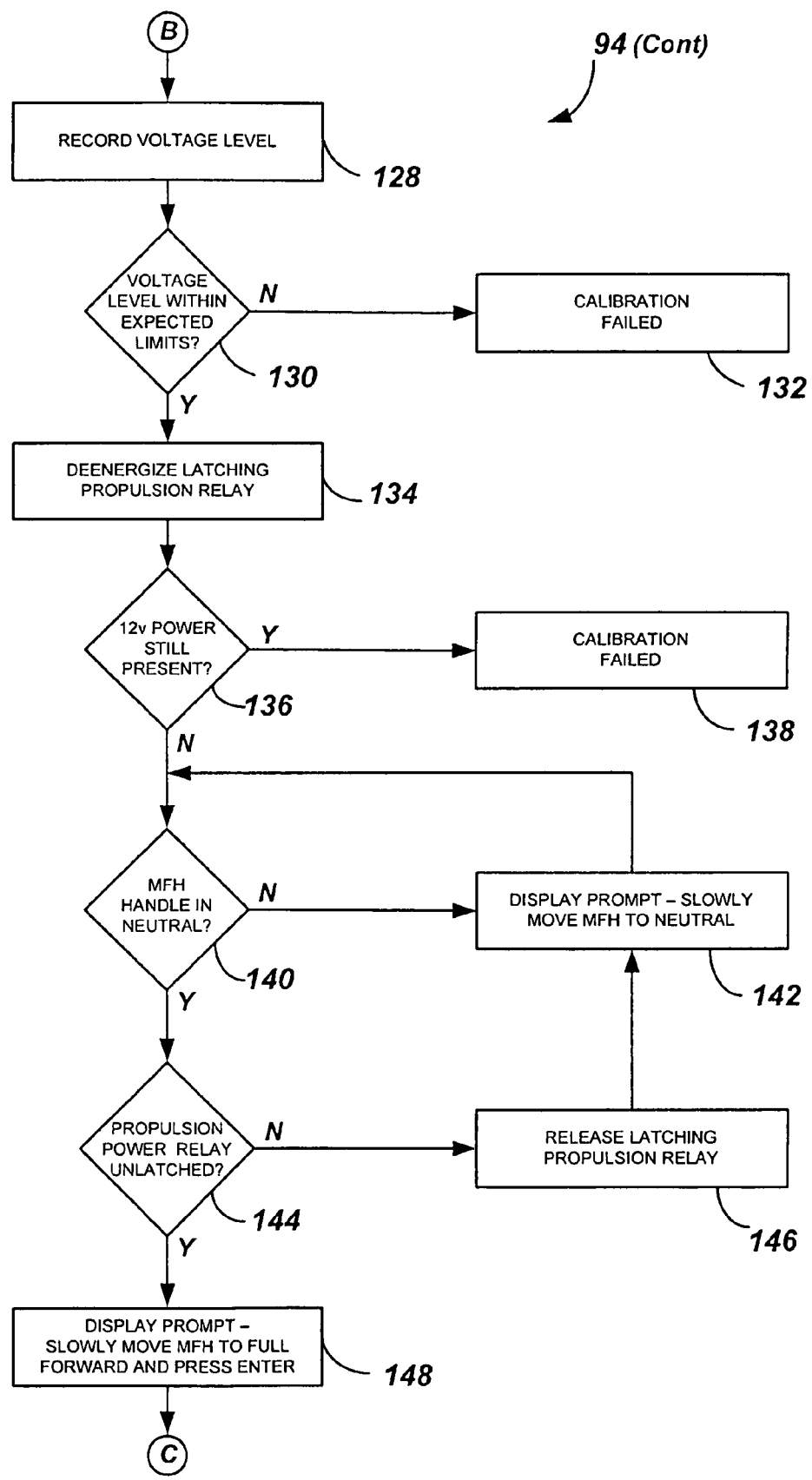
FIG. 8 is another continuation of the flow diagram of FIG. 6.
Figure 9:
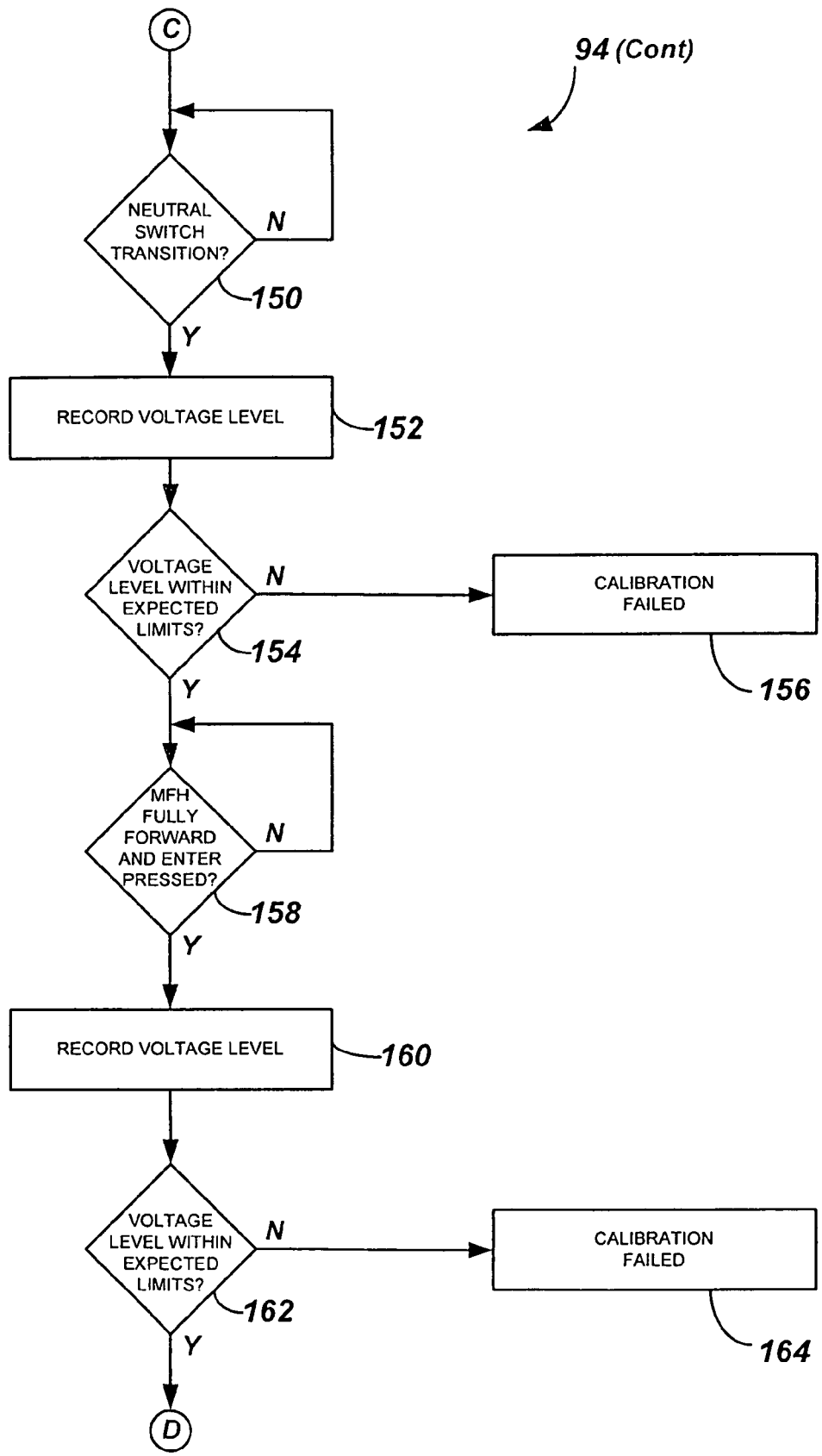
FIG. 9 is another continuation of the flow diagram of FIG. 6.
Figure 10:
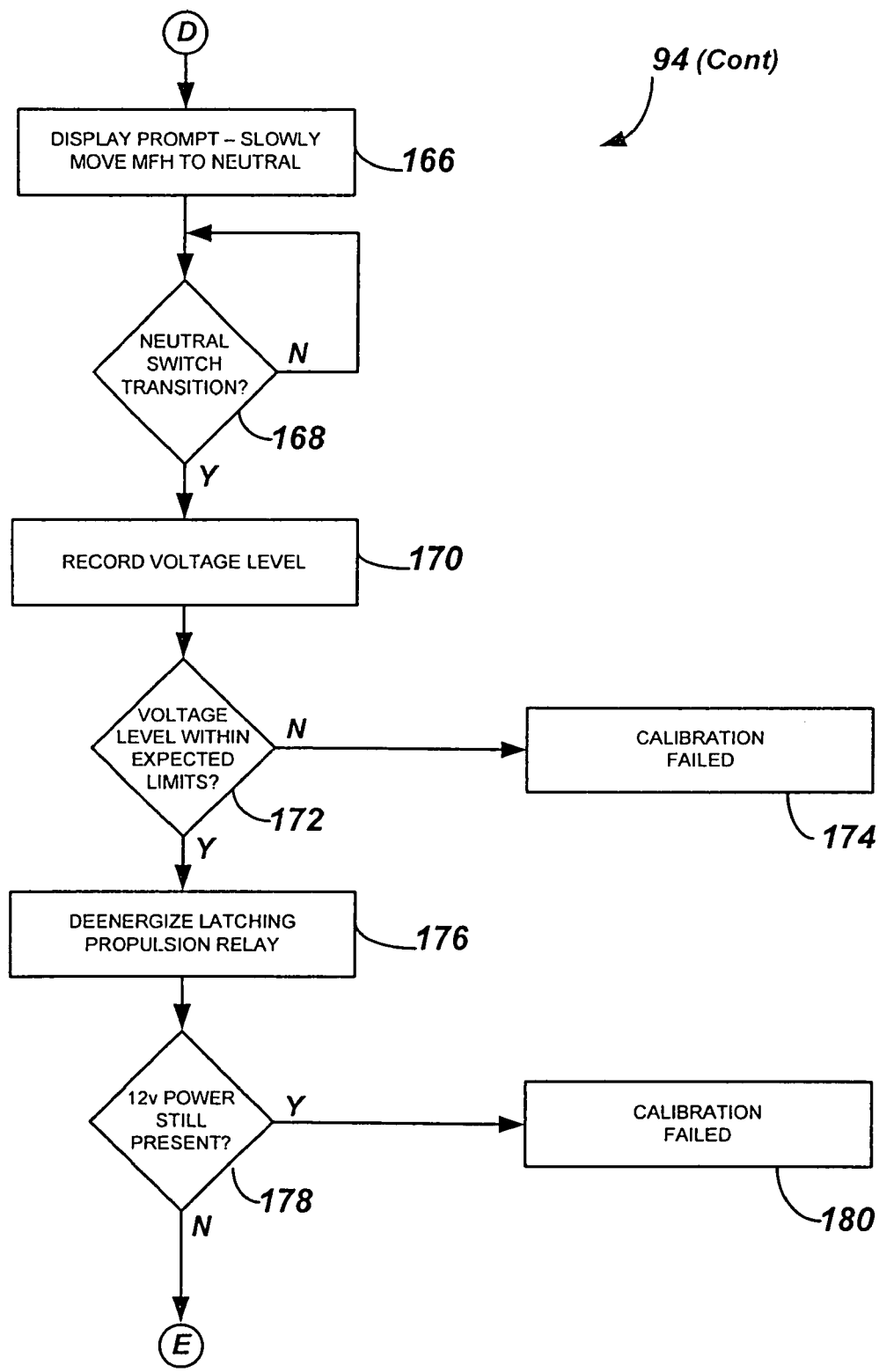
FIG. 10 is another continuation of the flow diagram of FIG. 6.
Figure 11:
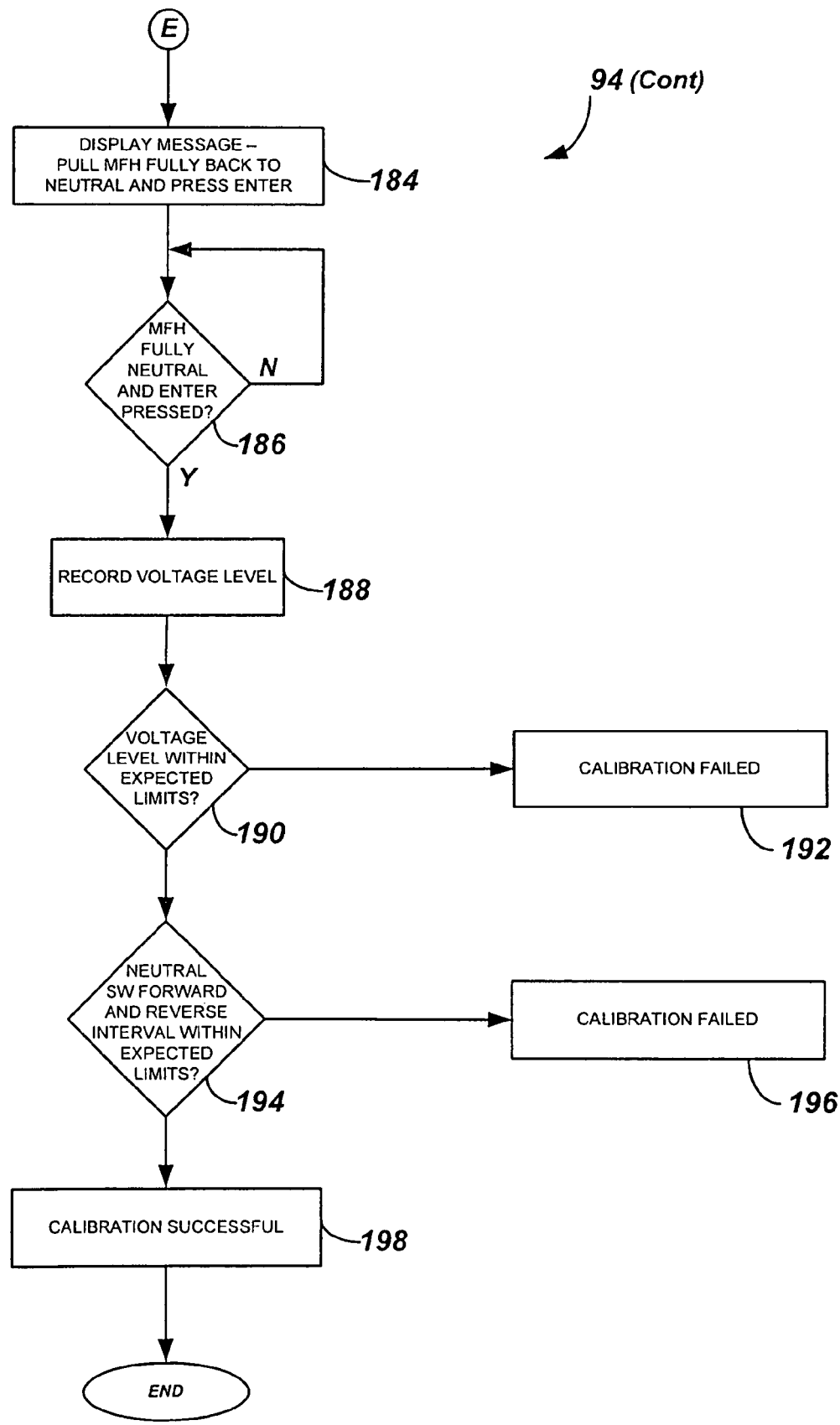
FIG. 11 is another continuation of the flow diagram of FIG. 6.

FIG. 5 schematically illustrates other aspects of propulsion driveline 22, including aspects of tractor control module 46 in connection with propulsion cylinder position sensors 80 and 82 which incorporate rotary potentiometer 62 (FIG. 2); a pintel arm position sensor 84 incorporating rotary potentiometer 66 (also FIG. 2); left and right ground speed sensors 86 and 88; a propulsion forward solenoid 90; and a propulsion reverse solenoid 92.

Referring collectively to FIGS. 2, 3, 4 and 5, this invention involves a method of calibrating and characterizing the operator controls, primarily potentiometer 42 and neutral switch 44, to enable precise operation of propulsion driveline 22 using FNR lever 40. More particularly, the method of the invention monitors (1) the potentiometer(s) 42 affixed to the FNR (forward-neutral-reverse) lever 40 that determines, among other things the direction and speed of the vehicle, (2) the FNR neutral switch 44 that determines whether or not the lever is in neutral, and (3) the operational condition (on/off) of the propulsion power and latching circuits. Operational ranges for the various system components are determined by the program designer, and any operation outside of these ranges will cause an destroke of the propulsion driveline or system to automatically occur, i.e., the propulsion drive shaft (shown as the horizontal rod 30 affixed to the two pintel arms 32 and 34 in FIG. 2) is brought to neutral. Destroke is a term used herein to indicate that the drive components are influenced to bring about a quick and controlled deceleration of the vehicle to zero ground speed. Other fault conditions can also be monitored; however, the ones discussed above are the most significant.

In particular, the invention is incorporated into an operating program that can be run by a processor of tractor control module 46, or another processor, to monitor fault conditions, such as faults like: FNR potentiometer fault—rate of change out of preset range; FNR neutral switch fault.

Also referring to FIGS. 6, 7, 8, 9, 10, and 11, a flow diagram 94 illustrating steps of a preferred embodiment of the method according to the invention is shown. By doing this, propulsion interlock relay 74 will be energized which allows continuity between the propulsion power source and the propulsion circuits that are necessary for this procedure. The proper starting point for the calibration is with the FNR lever 40 (hereinafter MFH) in its neutral position and with the propulsion latching relay 72 deenergized. The control module determines if the MFH is in neutral and whether relay 72 is unlatched as denoted by decision blocks 98 and 102. If it is not, the controller will momentarily remove power in an effort to unlatch the relay, as denoted by block 104, and will also provide a display prompt to the operator as denoted by block 100, telling him to move the MFH into neutral. When the control module determines that there exists a proper starting point for the procedure, it will prompt the operator to slowly move the MFH to a fully rearward position and press enter, as denoted by block 106. The controller now seeks to determine, as denoted by decision block 108, when the neutral switch 44 transitions as the MFH moves away from its neutral position.

Following balloon A, at the very moment that neutral switch 44 transitions, the voltage output of potentiometer 42 is recorded as denoted by block 110 and tested as denoted by decision block 112. If the voltage is not within expected limits the calibration fails as denoted by block 114. When the operator has moved the MFH to its fully rearward position and has pressed the enter key, as denoted by decision block 116, the voltage output of potentiometer 42 is recorded as denoted by block 118 and tested as denoted by decision block 120. If the voltage is not within expected limits the calibration fails as denoted by block 122. If the voltage is within expected limits the controller will prompt the operator to slowly move the MFH back to its neutral position, as denoted by block 124. The controller now seeks to determine, as denoted by decision block 126, when the neutral switch 44 transitions as the MFH moves back into its neutral position.

Following balloon B, at the very moment that neutral switch 44 transitions, the voltage output of potentiometer 42 is recorded as denoted by block 128 and tested as denoted by decision block 130. If the voltage is not within expected limits the calibration fails as denoted by block 132. If the voltage is within expected limits the controller now stops supplying power to the propulsion circuits, as denoted by block 134, in order to test whether the propulsion latching relay 72 has gone into an unlatched condition, as denoted by decision block 136. If relay 72 remains in a latched condition, the calibration fails as denoted by block 138. Otherwise, the controller determines if the handle is back in a proper starting point for the second half of the calibration procedure, which is with the MFH in its neutral position and with the propulsion latching relay 72 deenergized. The control module determines if the MFH is in neutral and whether relay 72 is unlatched as denoted by decision blocks 140 and 144. If it is not, the controller will momentarily remove power in an effort to unlatch the relay, as denoted by block 146, and will also provide a display prompt to the operator as denoted by block 142, telling him to move the MFH into neutral. When the control module determines that there exists a proper starting point for the procedure, it will prompt the operator to slowly move the MFH to a fully forward position and press enter, as denoted by block 148.

Following balloon C, the controller now seeks to determine, as denoted by decision block 150, when the neutral switch 44 transitions as the MFH moves away from its neutral position. At the very moment that neutral switch 44 transitions, the voltage output of potentiometer 42 is recorded as denoted by block 152 and tested as denoted by decision block 154. If the voltage is not within expected limits the calibration fails as denoted by block 156. When the operator has moved the MFH to its fully forward position and has pressed the enter key, as denoted by decision block 158, the voltage output of potentiometer 42 is recorded as denoted by block 160 and tested as denoted by decision block 162. If the voltage is not within expected limits the calibration fails as denoted by block 164.

Following balloon D, if the voltage is within expected limits the controller will prompt the operator to slowly move the MFH back to its neutral position, as denoted by block 166. The controller now seeks to determine, as denoted by decision block 168, when the neutral switch 44 transitions as the MFH moves back into its neutral position. At the very moment that neutral switch 44 transitions, the voltage output of potentiometer 42 is recorded as denoted by block 170 and tested as denoted by decision block 172. If the voltage is not within expected limits the calibration fails as denoted by block 174. If the voltage is within expected limits the controller now stops supplying power to the propulsion circuits, as denoted by block 176, in order to test whether the propulsion latching relay 72 has gone into an unlatched condition, as denoted by decision block 178. If relay 72 remains in a latched condition, the calibration fails as denoted by block 180.

Following balloon E, the control module will prompt the operator to pull the MFH fully back to its neutral position and press enter, as denoted by block 184. When the operator has moved the MFH to its neutral position and has pressed the enter key, as denoted by decision block 186, the voltage output of potentiometer 42 is recorded as denoted by block 188 and tested as denoted by decision block 190. If the voltage is not within expected limits the calibration fails as denoted by block 192. If that voltage is within expected limits the controller then tests the neutral switch forward voltages in relation to the neutral switch reverse voltages to see if they are within expected limits, as denoted by decision block 194. If it is not within expected limits the calibration fails as denoted by block 196. If those voltages are within expected limits the calibration procedure is over and it is reported as being successful.

The following is a sample calibration procedure for a FNR lever or MFH according to the instant invention, referring to propulsion driveline 22. The voltage values set forth in the following calibration procedure are intended to be illustrative only, and are not to be interpreted as limiting.

MFH Calibration Procedure

Turn key switch to ON position. Depress and hold both Display Select switches for approx 10 seconds . . . until the Dealer Setup Menu appears on the Display Select and enter into Calibration Mode Select "MFH Position R-18" . . . follow directions on display
NOTE: Move MFH slowly, especially when leaving or entering the Neutral area. During the calibration procedure, the MFH potentiometer 42 voltage is always tested for being out of limit high or low. If out of limit, a fault is determined and the calibration fails. The low limit is 0.836 volts. The high limit is 3.832 volts.

If the MFH is not at neutral the operator will be prompted to move it to neutral. The Display will read "Slowly Move MFH To Neutral".

The operator will be prompted to switch the park brake off. The Display will read "Calibrating MFH . . . . Switch Brake OFF".

The control module tests that neutral switch 44 is open (high voltage at XCM input X002_26) and that propulsion enable relay 72 is not energized (low voltage). If so it will read "Slowly Move MFH To Full Rear and Press Enter". If not the Display will read "Slowly Move MFH To Neutral". If relay 72 is energized (high voltage) longer than 0.3 seconds after neutral switch 44 is open (high voltage at control module input X002_26), then a fault condition is determined and the calibration fails.

Going rearward with the MFH the control module records the potentiometer 42 voltage level when neutral switch 44 transitions. The expected voltage range is 2.638+−0.203 (2.435 to 2.841).

If <2.435, a fault is determined and the calibration fails.

If >2.841, a fault is determined and the calibration fails.

While going rearward the control module tests that propulsion enable relay 72 is energized (high voltage). If not, a fault is determined and the calibration fails.

When the MFH is fully rearward and enter is pressed, the control module tests that neutral switch 44 is open (high voltage at control module input X002_26). If not, a fault is determined and the calibration fails. It also tests that relay 72 is energized (high voltage at X001_08). If not, a fault is determined and the calibration fails. It then records the potentiometer 42 voltage level. The expected voltage range is 3.544+−0.238 (3.306 to 3.782)

If <3.306, a fault is determined and the calibration fails.

If >3.782, a fault is determined and the calibration fails.

Otherwise the display will read "Slowly Move MFH To Neutral".

Going back to neutral with the MFH the control module tests that relay 72 is energized (high voltage at X001_08). If not, a fault is determined and the calibration fails. The control module also records the potentiometer 42 voltage level when neutral switch 44 transitions (high voltage at control module input X002_26). The expected voltage range is 2.624+−0.213 (2.411 to 2.837).

If <2.411, a fault is determined and the calibration fails.

If >2.837, a fault is determined and the calibration fails.

The control module compares the neutral switch 44 voltage going out of neutral with the neutral switch 44 voltage coming back into neutral.

Two conditions must be met. The voltage coming back cannot be greater than the voltage going out and the difference between the two cannot be greater than 0.040 volts.

If >0.040, a fault is determined and the calibration fails.

The control module stops providing +12 power (X005-09) to relay 72 and one second later tests that relay 72 is not energized (low voltage at X001_08)). If the power is still there after one second, a fault is determined and the calibration fails. Otherwise the control module tests for switch 44 being open (low voltage at control module input X002_26) and relay 72 is not energized (low voltage at X001_08). If so it will read "Slowly Move MFH To Full Forward and Press Enter". If not the Display will read "Slowly Move MFH To Neutral". If relay 72 is energized (high voltage at X001_08) longer than 0.3 seconds after neutral switch 44 is open (high voltage at control module input X002_26), then a fault condition is determined and the calibration fails.

Going forward with the MFH the control module records the potentiometer 42 voltage level when neutral switch 44 transitions. The expected voltage range is 2.371+−0.195 (2.176 to 2.566).

If <2.176, a fault is determined and the calibration fails.

If >2.566, a fault is determined and the calibration fails.

While going forward the control module tests that relay 72 is energized (high voltage at X001_08). If not a fault is determined and the calibration fails.

When fully forward and enter is pressed, the control module tests that neutral switch 44 is open (high voltage at control module input X002_26). If not, a fault is determined and the calibration fails. It also tests that relay 72 is energized (high voltage at X001_08). If not, a fault is determined and the calibration fails. It then records the potentiometer 42 voltage level. The expected voltage range is 1.116+−0.230 (0.886 to 1.346).

If <0.886 a fault is determined and the calibration fails.

If >1.346 a fault is determined and the calibration fails.

Otherwise the display will read "Slowly Move MFH To Neutral".

Going back to neutral with the MFH the control module tests that relay 72 is energized (high voltage at X001_08). If not, a fault is determined and the calibration fails. The control module also records the potentiometer 42 but voltage level when neutral switch 44 transitions (high voltage at control module input X002_26). The expected voltage range is 2.383+−0.192 (2.191 to 2.575).

If <2.191, a fault is determined and the calibration fails.

If >2.575, a fault is determined and the calibration fails.

The control module compares the S-03 voltage going out of neutral with the S-03 voltage coming back into neutral.

Two conditions must be met. The voltage going out cannot be greater than the voltage coming back and the difference between the two cannot be greater than 0.025 volts.

If >0.025, a fault is determined and the calibration fails.

The control module stops providing +12 power (X005-09) to relay 72 and one-tenth second later tests that relay 72 is not energized (low voltage at X001_08)). If the power is still there after one-tenth second, a fault is determined and the calibration fails. Otherwise the Display will read "Pull MFH Fully Back To Neutral And Press Enter".

When enter is pressed at full neutral, the control module records the potentiometer 42 voltage level and the display will read "Calibrating MFH Please Wait . . . ". The control module then calculates the following:

the midpoint between the 2 reverse switchpoints, the midpoint between the 2 forward switchpoints, the voltage span between the forward and reverse midpoints the 25% point and 75% point in that voltage span The control module tests the difference between the forward and reverse midpoints. The expected voltage difference is 0.253+−0.072 (0.181 to 0.325).

If >0.325 volts, a fault is determined and the calibration fails.

If <0.181 volts, a fault is determined and the calibration fails.

The control module also tests the full neutral voltage reading and compares it to the forward and reverse midpoints to see that it is fairly centered (25 to 75%) within the span between the forward and reverse midpoints.

If voltage at neutral>reverse midpoint−25%, a fault is determined and the calibration fails.

If voltage at neutral<forward midpoint+25%, a fault is determined and the calibration fails.

Otherwise the display will read "Calibration Successful".

Turn key switch to OFF position and keep it off for a minimum of 3 seconds.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

What is claimed is:

1. A method for calibrating a FNR lever movable for controlling a propulsion driveline of an agricultural windrower, comprising steps of:

providing a FNR lever assembly including a FNR lever having a neutral position and movable in relation to the neutral position in a first direction and in a second direction opposite the first direction, and a sensor disposed and operable for sensing positions of the FNR lever and outputting signals representative thereof;

providing a programmable control module in connection with the sensor and operable for receiving the signals representative of the FNR lever position, the programmable control module being connected to the propulsion driveline and programmed for automatically outputting signals thereto for controllably operating the propulsion driveline for propelling the windrower in a direction and at a speed which are functions of the sensed FNR lever position;

prompting a user to move the FNR lever in the first direction to the neutral position;

as the FNR lever is moved in the first direction toward the neutral position responsive to the prompt, sensing at least one actual position of the FNR lever and outputting a signal representative thereof to the control module; and comparing a value of the signal representative of the actual position of the FNR lever to predetermined high and low values for the signal, and if the value of the signal representative of the actual position is greater than the predetermined high value or below the predetermined low value, then determining that a fault condition exists; and if the value of the signal representative of the actual position is less than the predetermined high value and greater than the predetermined low value, then storing the value of the signal representative of the actual position for use in determining a speed of movement for the windrower when the FNR lever is subsequently in the actual position.

2. The method of claim 1, comprising additional steps of:

prompting the user to move the FNR lever in the first direction to a predetermined first position spaced in the first direction from the neutral position; and as or after the FNR lever is moved in the first direction toward the predetermined first position, prompting the user to acknowledge that the FNR lever is in the predetermined first position, and if an acknowledgment that the FNR lever is in the predetermined first position is received, then comparing a value of a signal outputted by the sensor when the FNR lever is in the predetermined first position to predetermined high and low values therefor, and if the value of the signal outputted by the sensor when the FNR lever is in the predetermined first position is greater than the predetermined high value therefor or less than the predetermined low value therefor, then determining that a fault condition exists; and if the value of the signal outputted by the sensor when the FNR lever is in the predetermined first position is less than the predetermined high value therefor and greater than the predetermined low value therefor, then storing the value of the signal representative of the actual position for use in determining a speed of movement for the windrower when the FNR lever is subsequently moved in the first direction.

3. The method of claim 2, wherein the predetermined first position comprises a full rearward position.

4. The method of claim 2, comprising additional steps of:
prompting the user to move the FNR lever in the second direction to a predetermined second position spaced in the second direction from the neutral position; and as or after the FNR lever is moved in the second direction toward the predetermined second position, prompting the user to acknowledge that the FNR lever is in the predetermined second position, and if an acknowledgment that the FNR lever is in the predetermined second position is received, then comparing a value of a signal outputted by the sensor when the FNR lever is in the predetermined second position to predetermined high and low values therefor, and if the value of the signal outputted by the sensor when the FNR lever is in the predetermined second position is greater than the high value therefor or less than the low value therefor, then determining that a fault condition exists; and if the value of the signal outputted by the sensor when the FNR lever is in the predetermined second position is less than the high value therefor and greater than the low value therefor, then storing the value of the signal representative of the actual position for use in determining a speed of movement for the windrower when the FNR lever is subsequently moved in the second direction.

5. The method of claim 4, wherein the predetermined second position comprises a full forward position.

6. The method of claim 1, comprising a further step of comparing a rate of change of values of signals outputted by the sensor as the FNR lever is moved, to a predetermined range of values for the rate of change, and if the rate of change of the values of the signals outputted by the sensor are outside of the predetermined range, then determining that a fault condition exists.

7. The method of claim 1, wherein the propulsion driveline comprises a relay in connection with the programmable control module and operable for latching responsive to presence of a signal from the control module for outputting a voltage to elements of the driveline, the relay being operable for unlatching responsive to absence of the signal from the control module to discontinue outputting the voltage to the elements of the driveline; and wherein at a predetermined time after discontinuing the signal to the relay, the control module will determine whether the relay is outputting the voltage, and if yes, then will determine that a fault condition exists.

8. The method of claim 1, wherein the signals outputted by the sensor comprise voltages.

9. The method of claim 1, wherein the sensor comprises a potentiometer.

10. The method of claim 1, wherein the control module will only enable operation of the propulsion driveline after completion of the steps of the method with no fault condition determined.

11. The method of claim 1, comprising further steps of:
providing a device which changes state when the FNR lever is moved from the neutral position; and when the device changes state, sensing a position of the FNR lever and outputting a signal representative thereof to the control module; and comparing a value of the signal representative of the position of the FNR lever when the device changes state to predetermined high and low values therefor, and if the value of the signal when the device changes state is greater than the predetermined high value therefor or below the predetermined low value therefor, then determining that a fault condition exists.

12. The method of claim 11, comprising a step of if the value of the signal when the device changes state is less than the predetermined high value therefor and greater than the predetermined low value therefor, then storing the value of the signal when the device changes state for use in determining a speed of movement for the windrower.

13. The method of claim 11, wherein the device comprises a switch.

14. A system for calibrating a FNR lever movable for controlling a propulsion driveline of an agricultural windrower, comprising:

a FNR lever assembly including a FNR lever having a neutral position and movable in relation to the neutral position in a first direction and in a second direction opposite the first direction, and at least one sensor disposed and operable for sensing positions of the FNR lever and outputting signals representative thereof;

a programmable control module in connection with the sensor and operable for receiving the signals representative of positions of the FNR lever therefrom and responsively outputting signals for operating the propulsion driveline for moving the windrower in directions and at speeds which are functions of the position of the FNR lever;

wherein the control module is programmed for automatically executing a calibration routine responsive to predetermined movements of the FNR lever wherein values of the signals representative of positions of the FNR lever during the predetermined movements are monitored and compared to predetermined normal values for the signals, and if any of the values of the signals representative of positions of the FNR lever differ from the predetermined normal values therefor, the control module will determine that a fault condition exists and the predetermined movements include a movement in the first direction toward the neutral position; a movement in the second direction toward the neutral position; and a movement in at least one of the first and second directions away from the neutral position.

15. The system of claim 14, wherein as part of the calibration routine during at least one of the movements of the FNR lever, the control module will compare a rate of change of values of signals outputted by the sensor to a predetermined range of values for the rate of change, and if the rate of change of the values of the signals outputted by the sensor are outside of the predetermined range, then determine that a fault condition exists.

16. The system of claim 14, wherein the at least one sensor comprises a potentiometer.

17. The system of claim 14, wherein the control module is programmed so as to only operate the propulsion driveline to propel the windrower after completion of the calibration routine with no fault conditions determined.

18. A system for calibrating a FNR lever movable for controlling a propulsion driveline of an agricultural windrower, comprising:

a FNR lever assembly including FNR lever having a neutral position and movable in relation to the neutral position in a first direction and in a second direction opposite the first direction, and at least one sensor disposed and operable for sensing positions of the FNR lever and outputting signals representative thereof;

a programmable control module in connection with the sensor and operable for receiving the signals representative of positions of the FNR lever therefrom and responsively outputting signals for operating the propulsion driveline for moving the windrower in directions and at speeds which are functions of the position of the FNR lever;

wherein the control module is programmed for automatically executing a calibration routine responsive to predetermined movements of the FNR lever wherein values of the signals representative of positions of the FNR lever during the predetermined movements are monitored and compared to predetermined normal values for the signals, and if any of the values of the signals representative of positions of the FNR lever differ from the predetermined normal values therefor, the control module will determine that a fault condition exists; and the at least one sensor includes a neutral switch having a first operating state when the FNR lever is in the neutral position, and a second operating state wherein the FNR lever is in a position other than the neutral position, and the control module is programmed as part of the calibration routine to monitor the operating state of the neutral switch as the FNR lever is moved to the neutral position and away therefrom, and if the operating state of the neutral switch does not correspond to the position of the FNR lever, then to determine that a fault condition exists.

19. The system of claim 18, wherein the control module is programmed to energize a relay of the propulsion driveline for outputting a predetermined voltage when the neutral switch is in the second operating state, and to de-energize the relay responsive to the neutral switch being changed to the first operating state, and the control module being programmed as part of the calibration routine to monitor the output of the relay at a predetermined time after the neutral switch is changed to the first operating state, and if the relay is outputting the predetermined voltage at the predetermined time, then to determine that a fault condition exists.

* * * * *